Dec. 31, 1968　　　　P. H. PALEN　　　　3,419,692
PRESSURE RESPONSIVE ACTUATOR WHEREIN A SPRING IS ADJUSTED
BY ROTATION OF THE HOUSING TO CHANGE ACTUATION PRESSURE
Filed Jan. 16, 1967
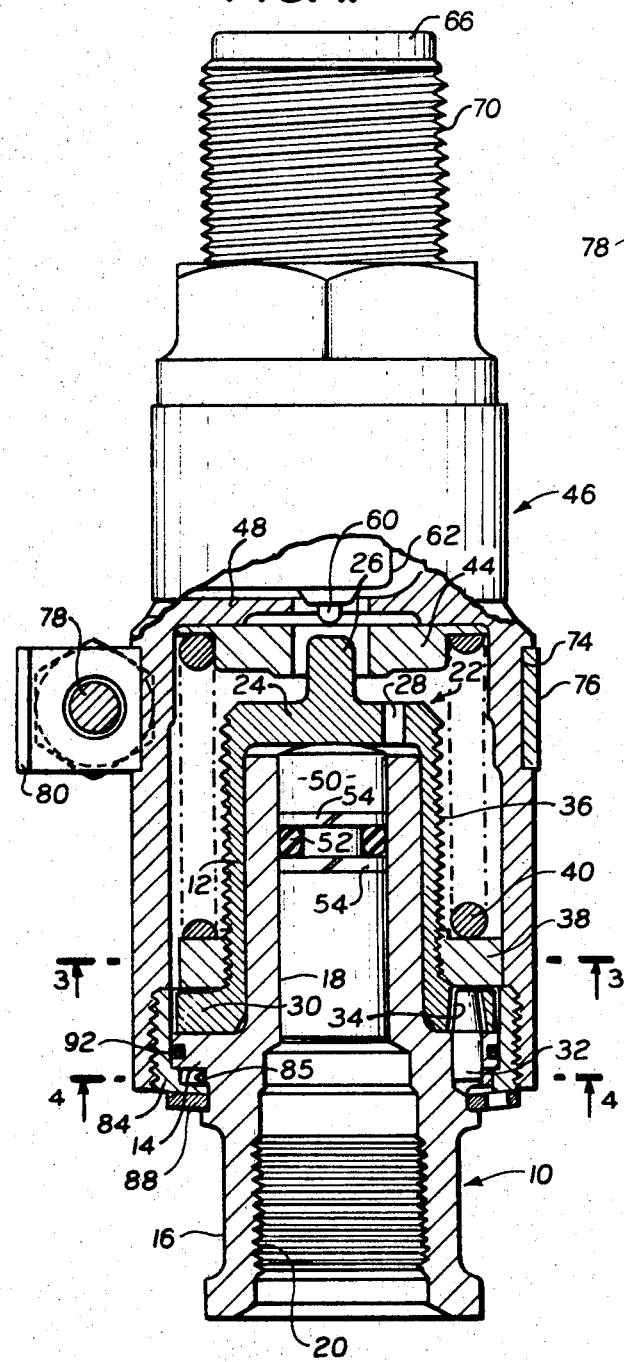
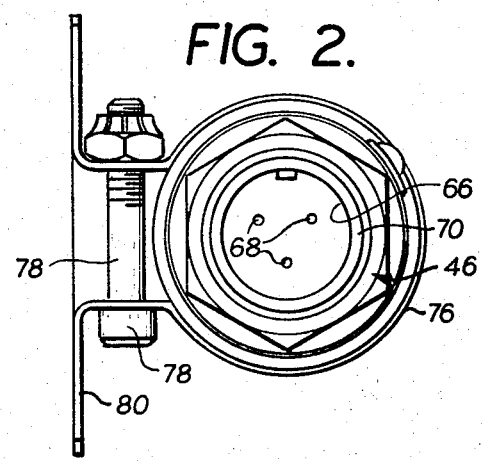
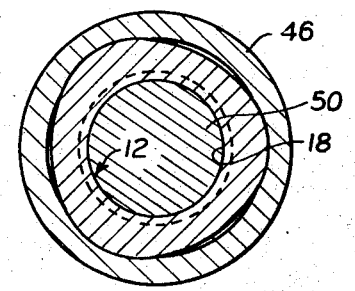
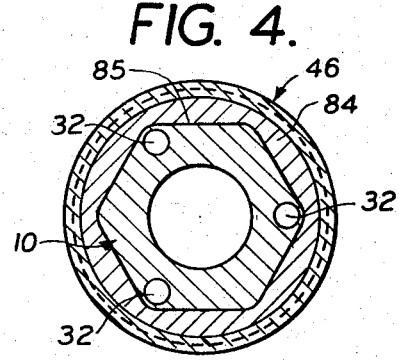
INVENTOR
Peter H. Palen
BY
ATTORNEYS.

United States Patent Office 3,419,692
Patented Dec. 31, 1968

3,419,692
PRESSURE RESPONSIVE ACTUATOR WHEREIN A SPRING IS ADJUSTED BY ROTATION OF THE HOUSING TO CHANGE ACTUATION PRESSURE
Peter H. Palen, Lake Mohawk, N.J., assignor to Sigma-Netics, Inc., Mountain Lakes, N.J., a corporation of New Jersey
Filed Jan. 16, 1967, Ser. No. 615,036
11 Claims. (Cl. 200—82)

ABSTRACT OF THE DISCLOSURE

This invention is an actuator construction for operating an electric switch or other device in response to fluid pressure. It provides a simple and self-contained construction in which the working fluid enters the actuator through a post that serves as a guide for the movable element of the actuator. A spring which opposes the motion can be adjusted, to change the pressure at which the actuator operates, by rotating an outside housing; and the same spring that opposes the fluid pressure also holds the housing in a locked position so that adjustment of spring pressure cannot occur as the result of vibration or accidental brushing against the housing in a tangential direction.

Brief summary of the invention

This invention provides an improved actuator that is simple and rugged, and with a particularly convenient construction for adjusting the actuator to operate at different pressures.

It provides a fluid operated actuator with a spring for resisting the fluid pressure and with the same spring used for holding the actuator locked in any position to which it is adjusted to change its operating pressure.

The invention provides an actuator with a housing mounted on a body and forming with the body a chamber in which the working parts of the actuator are enclosed. In the preferred construction, the housing is rotatable to adjust the actuator to operate at different pressures and the housing is movable axially to change it from an unlocked condition, where it can be rotated freely, to a locked condition that maintains the actuator in any adjusted position.

The actuator has all of the working parts enclosed in a chamber which can be sealed, if desired; and the parts can be adjusted to change the operating pressure of the actuator by rotating the housing from the outside without disturbing the sealing of the chamber.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a side view, partly in elevation and partly in section, of an actuator made in accordance with this invention;

FIGURE 2 is a top plan view of the actuator shown in FIGURE 1, the view being on a reduced scale; and FIGURES 3 and 4 are sectional views, on a reduced scale, taken on the lines 3—3 and 4—4, respectively, of FIGURE 1.

Detailed description of the invention

The actuator shown in FIGURE 1 includes a body 10 having an upwardly extending cylindrical post 12 and having a flange 14 at the lower end of the post. The actuator body 10 has a lower end 16 for connection with a hose or other structure from which working fluid is supplied to the actuator. In the construction shown, there is a passage 18 extending axially through body 10 and opening through the upper end of the post 12. At the lower end of the passage 18 there is a counterbore with threads 20 for connecting the actuator with a fitting for receiving a hose or for connection with any other structure for supplying working fluid to the interior of the actuator.

The outside surface of the post 12 is preferably cylindrical and there is a cap 22 which fits over the post 12 and which is axially movable on the post as a guide. The cap 22 has an upper end 24 with an abutment 26 extending therefrom, and has an opening 28 for flow of fluid through the end wall 24 of the cap. The sides of the cap 22 extend downwardly along the outside surface of the post 12 and there is a flange 30 at the lower end of the cap 22.

The post 12 and cap 22 can have other than cylindrical cross-sections, but a cylindrical cross-section is the most convenient to manufacture. The flange 30 provides an annular surface at the bottom of the cap 22 for contact with the flange 14 of the actuator body 10.

A pin 32 extends through the flange 14 and upward into a recess 34 in the flange 30 of the cap. The upwardly extending portion of the pin 32, beyond the top of the flange 14, serves as a fixed stud, and it is preferably tapered and fits loosely into the recess 34. This stud prevents relative rotation of the cap 22 with respect to the body 10 when the cap 22 is in its downward position, as shown in FIGURE 1.

There are preferably a plurality of pins 32 located at angularly spaced locations around the flange 14. There are corresponding recesses 34 in the flange 30 for each of the pins 32. These pins 32 extending into recesses 34 in the flange 30 of the cap are the preferred construction for preventing rotation of the cap on the post 12 but it will be evident that there are numerous other ways in which such rotation can be prevented, and in the broader aspects of the invention the pins 32 are merely representative of means for preventing rotation of the cap 22 on the post 12.

The outside surface of the cap 22, above the flange 30, has threads 36; and there is a nut or threaded collar 38 which fits the threads 36 and which can be screwed along the threads 36 to move this collar 38 axially on the cap 22. A spring 40 is compressed between the upper surface of the collar 38 and a contoured washer 44 located in a housing 46. The washer 44 is held against a top wall 48 of the housing 46 by the spring 40.

In order to adjust the tension of the spring 40, the collar 38 is moved axially along the cap threads 36. The spring 40 preferably has some tension even when the collar 38 is adjusted to its lowermost position, as shown in FIGURE 1. It will be evident that movement of the collar 38 upward along the threads 36 of the cap 22 increases the tension of the spring 40 and increases the pressure of working fluid necessary to move the cap 22 against the force of the spring 40.

The upper part of the passage 18 provides a cylinder for a piston 50. This piston is of substantial length so that its upper end can extend beyond the top of the post 12 and still leave the piston with ample axial length of bearing on the cylindrical wall provided by the passage 18. The piston 50 has a ring 52, which is preferably an O-ring located in a circumferential slot in the piston. Also in the slot are ring back-ups 54.

The upper end of the piston 50 contacts with the underside of the end wall 24 of the cap 22; and when pressure under the piston 50 is sufficient to overcome the tension of the spring 40, the piston 50 rises and moves the cap 22 upward along the post 12. This moves the abutment 26 upward and eventually into contact with a button 60 of a micro-switch 62 located in a chamber of the housing 46 above the wall 48. The upper end of the housing 46 has an outlet 66 for receiving a connector which establishes contact with conductors 68 (FIGURE 2) in the outlet 66. There are preferably threads 70 on the outside of the wall of the outlet 66 for receiving a cap which is associated with the electrical connections.

The housing 46 has a circumferential recess 74 for receiving a band 76 which is clamped around the housing 46 by a bolt 78 and which comprises part of a bracket 80 for connecting the housing 46 to a support.

In order to adjust the tension of the spring 40, from outside the actuator, provision is made for rotating the collar 38 to screw it along the threads 36 by rotating the outside housing 46. This is done by giving the collar 38 a non-circular periphery which contacts with complementary non-circular sections of the inside wall of the housing 46 as shown in FIGURE 3. This operates on the principle of a key and keyway connection or a spline connection which permits axial movement of the parts but which requires that they rotate as a unit. Thus turning of the housing 46 about the longitudinal axis of the actuator turns the collar 38 and screws it along the threads 36 of the cap 22 to change the tension of the spring.

It is important, however, to prevent the housing 46 from rotating accidentally, or as the result of vibration, with respect to the body 10 of the actuator. To prevent such accidental rotation, and to hold the housing 46 on the body 10, there is a ring 84 screwed into the lower end of the housing 46 and forming a part of the housing. This ring 84 extends under a flange 14 of the body 10, the lower surface of this flange 14 providing an annular shoulder with which the inwardly extending portion of the ring 84 comes in contact. The force of the spring 40 holds the rings 84 against the bottom surface of the flange 14.

In order to prevent relative rotation of the housing 46 and the actuator body 16, at times when no adjustment of spring tension is to be made, the perimeter of the body 16, for a limited distance below its flange 14, has a non-circular face 85, and the inside surface of the ring 84, which projects under the flange 14, is made with the same non-circular shape to fit closely over the face 85 of the body 16 as shown in FIGURE 4. In the construction shown, these surfaces are hexagonal but other non-circular shapes can be used.

When the housing 46 is moved axially downward far enough for the ring 84 to move beyond the lower ends of the non-circular face 85 of the body 16, then the housing 46 can be rotated on the body 16. A snap ring 88 located in a groove in the body 10 immediately below the ring 84 prevents downward movement of the housing 46. This ring 88 and the groove in which it is held are just below the non-circular face 85 which fits into the ring 84 to prevent the ring 84 and its integrally connected housing 46 from rotating with respect to one another. The snap ring 88 is resilient and can be removed from the groove to permit downward movement of the housing 46 on the body 16 whenever adjustment of the spring 40 is desired.

With the snap ring 88 removed, the housing 46 still remains in its upward position, with the ring 84 in contact with the flange 14, because of the pressure of the spring 40. However, the housing 46 can be pushed downward against the tension of the spring 40, or the actuator body 10 can be pushed upward if the housing 46 is held stationary by the bracket 80; and this relative movement of the housing 46 and body 10 moves the ring 84 beyond the non-circular face 85 of the body 16 so that the housing or body can be rotated to screw the collar 38 along the cap 22.

From the foregoing description it will be apparent that the spring 40 serves a dual function. In addition to providing the loading on the cap 22, so as to determine the pressure at which the cap 22 will move upward to operate the switch 62, the spring 40 also holds the housing 46 in position to keep the ring 84 in contact with the flange 14 so that the actuator is locked in its adjusted condition.

Although the actuator is shown with a switch 62 for operation when the abutment 26 is lifted by the piston 50, it will be understood that this abutment 26 can be used to move apparatus other than a switch. The actuator is of general application.

A sealing ring, such as an O-ring 92 can be provided in a circumferential groove in the periphery of the flange 14 and this ring 92 seals against the inside surface of the ring 84 so that the interior of the housing 46 is sealed at all times, even when pushed downward to clear the non-circular face 85 of the body 16.

The preferred embodiment of the invention has been illustrated and described, but changes and modifications can be made and some features can be used in different combinations without departing from the invention as described in the claims.

What is claimed is:

1. An actuator including a body with an upstanding cylindrical post at its upper end, a cap that fits over the post and that has a cylindrical portion extending downward along the outside of the cylindrical surface of the post, the cap being movable axially along the post as a guide, the passage in the post through which fluid under pressure is admitted to thrust the cap upward along the post, a spring for urging the cap downward on the post, a collar threaded on the outside of the cap and with which one end of the spring contacts, a housing with which the other end of the spring contacts, a connection through which rotation of the housing screws the collar along the threads on the post to change the compression of the spring whereby different fluid pressure under the cap is required to move the cap upward along the post, and means connecting the housing with the actuator body for rotation on said actuator body.

2. The actuator described in claim 1 characterized by an interference on the body for preventing rotation of the housing on the body, the housing being movable axially on the body into a position beyond the interference whereby the housing becomes free to rotate with respect to the body.

3. The actuator described in claim 2 characterized by the spring urging the housing to move into a position where the interference is effective to prevent rotation of the housing with respect to the body.

4. The actuator described in claim 3 characterized by releasable locking means on the body for preventing the housing from moving axially on the body out of range of the interference.

5. The actuator described in claim 4 characterized by said locking means being a snap ring projecting around its periphery from a circumferential groove in the body and into the path of axial movement of the housing with respect to the body, the snap ring being flexible and expandable for removal from said groove to release the locking means.

6. The actuator described in claim 1 characterized by the housing extending across the upper end of the spring and then downward beyond the lower end of the spring and beyond the lower end of the post, the nut being of non-circular cross-section and fitting into a non-circular cross-section of the housing, a flange on the actuator body at the lower end of the post forming with the housing a chamber that encloses the post, the fluid passage through the post extending axially thereof and forming a cylinder within the post open at the upper end of the post, a piston in the cylinder for transmitting fluid pressure to the cap, a piston ring for sealing the piston, and a seal between the housing and the flange for preventing entrance of foreign matter into the chamber.

7. The actuator described in claim 6 characterized by the body having a lower end with means for connecting it with a structure from which fluid under pressure is supplied to said passage, and said passage extending through the lower end of the post and through the lower end of the body for register with an opening in said structure from which the fluid for the actuator is supplied.

8. The actuator described in claim 1 characterized by the post fitting the cap as a piston in a cylinder, the extent of the cap along the post being substantially greater than the stroke of the actuator, and a sealing ring for preventing escape of fluid from the running clearance between the post and the inside surface of the cap.

9. The actuator described in claim 1 characterized by an electric switch in the housing including a part located in the path of movement of the cap for actuation by movement of the cap in response to fluid pressure under the cap.

10. The actuator described in claim 9 characterized by an abutment on top of the cap, the electric switch being a micro-switch having an operating button, the button being located in the path of movement of said abutment.

11. The actuator described in claim 1 characterized by the actuator body having a flange with a bottom face forming an annular shoulder facing downward away from the post, and the housing being of composite construction and having a ring with a flange that contacts with the shoulder to hold the ring against upward displacement and that comprises part of the means for connecting the housing to the actuator body for rotation with respect to the body, and other means on the body holding the ring against downward displacement, threads on the outside of the ring engaging complementary threads on the inside of the housing and integrally connecting the housing with the ring, a non-circular outside surface of the body extending downward from the shoulder, a non-circular surface on the inside of the ring that fits the non-circular section of the body to prevent rotation of the ring and housing with respect to the body while the ring is in a position adjacent to the shoulder, and a stud extending upward from the flange into a recess in a portion of the cap to prevent rotation of the cap.

References Cited

UNITED STATES PATENTS

| | | | |
|---|---|---|---|
| 1,475,697 | 11/1923 | Hartman | 200—82.2 |
| 2,824,919 | 2/1958 | Davis | 200—83.91 |
| 2,844,679 | 7/1958 | Brewer et al. | 200—82.2 |
| 3,077,854 | 2/1963 | Pall | 200—82.2 XR |

FOREIGN PATENTS 695,361  10/1964  Canada.

ROBERT K. SCHAEFER, *Primary Examiner.*

H. BURKS, *Assistant Examiner.*

U.S. Cl. X.R.

200—83, 153